United States Patent [19]

Kondo et al.

[11] 4,257,458

[45] Mar. 24, 1981

[54] REED VALVE

[75] Inventors: Takashi Kondo, Oobu; Yasuo Tagawa, Kariya; Kiyohiko Mizuno, Nagoya; Nobutoshi Tsuboi, Aichi, all of Japan

[73] Assignees: Nippondenso Co., Ltd., Kariya; Toyota Jidosha Kogyo Kabushiki Kaisha, Toyota, both of Japan

[21] Appl. No.: 886,593

[22] Filed: Mar. 14, 1978

[30] Foreign Application Priority Data

Mar. 16, 1977 [JP] Japan .................................. 52-31615

[51] Int. Cl.³ .............................................. F16K 15/14
[52] U.S. Cl. .................................. 137/855; 137/856; 137/512.15; 251/359
[58] Field of Search ............... 137/855, 856, 857, 858, 137/527, 527.2, 527.4, 527.6, 527.8, 512.15; 251/359

[56] References Cited

U.S. PATENT DOCUMENTS

| 2,519,541 | 8/1950 | Bryant | 251/359 X |
| 2,621,011 | 12/1952 | Smith | 251/359 X |
| 4,083,184 | 4/1978 | Ushijima et al. | 137/856 X |
| 4,089,348 | 5/1978 | Yoshida et al. | 137/856 |

FOREIGN PATENT DOCUMENTS

| 2625057 | 2/1977 | Fed. Rep. of Germany | 137/856 |
| 2625059 | 2/1977 | Fed. Rep. of Germany | 137/856 |

Primary Examiner—William R. Cline
Attorney, Agent, or Firm—Cushman, Darby & Cushman

[57] ABSTRACT

In a reed valve of the type having a base formed with one or more apertures through which flows a fluid, a shock absorbing seat attached to the upper surface of the base so as to surround the one or more apertures at the inner peripheral edge thereof, and a reed having one end securely fixed to the base, whereby the reed is forced to move to seat on the seat, thereby closing the one or more apertures and to move away therefrom, thereby opening the one or more apertures, at least a portion of the inner peripheral edge of the seat which engages with the free end portion of the reed is spaced outwardly away from the upper edge of the aperture by a suitable distance and is beveled or curved.

7 Claims, 3 Drawing Figures under the free end portion of the reed the inner peripheral wall 32 of the seat 3 is displaced outwardly from the inner wall 11 of the base 1 so that the free end portion of the reed 4 will not strike against the seat 3. As a result, no excessive stress concentration will result and consequently the cracking or fracturing of the seat 3 may be prevented. Thus the service life of the reed valve may be extended considerably.

REED VALVE

BACKGROUND OF THE INVENTION

The present invention relates to a pressure-responsive reed valve especially adapted for use in a system for introducing the secondary air by utilizing the negative pressure produced in an exhaust system, especially at a portion in the vicinity of an exhaust port of an internal combustion engine.

In general, a conventional reed valve comprises a base formed with at least one aperture through which flows a fluid, a rubber seat embedded in the base so as to surround the aperture at the inner peripheral surface thereof, and a reed made from sheet steel and having its one end securely fixed to the base so that it is forced to seat on the seat, thereby closing the aperture and to move away from the seat at its free end thereby opening the aperture. The inner peripheral surface of the seat is in line with the inner peripheral wall of the aperture, and the upper edge of the inner peripheral surface of the seat which engages with the free end portion of the reed is slightly beveled or rounded.

When the reed valve of the type described above is installed in the secondary air supply system of the type described above, the reed is forced to move away from the seat when the pressure of exhaust gases drops negative, whereby the aperture is opened to draw the secondary air. When the pressure of exhaust gases rises positive the reed is forced to strike against the seat, thereby closing the aperture, whereby the suction of the secondary air into the exhaust system may be interrupted.

In accordance with the type of an engine and the construction and arrangement of its exhaust system and secondary air intake system, however, the pressure of exhaust gases rises extremely high in a special speed range under a heavy load, especially in a speed range in which the exhaust gases flow reversely through the reed valve toward the secondary air intake system. As a result the reed is forced to violently strike against the seat under increased force and consequently it forcibly depresses the seat. The resultant deformation of the seat is especially remarkable at the portion which engages with the free end portion of the reed. Moreover, the on-off operations of the reed valve are as high as several tens to one hundred and several tens times per second so that this portion of the seat is subjected to extreme stress concentration and fatigue. As a consequence, the rubber seat is subjected to cracking and fracturing within a short time.

SUMMARY OF THE INVENTION

One of the objects of the present invention is to provide a reed valve in which the above disadvantages of the prior art reed valves may be eliminated.

To this end the present invention provides a reed valve comprising a base formed with at least one aperture through which a fluid flows, a shock absorbing seat attached to the upper surface of said base and having at least one aperture in registered relation with said aperture of said base and a reed made of a resilient sheet material and securely fixed at its one end to said base so as to extend over said aperture of said seat for opening and closing said aperture in response to the pressure variations applied to the upper surface thereof, in which at least a portion of the inner peripheral wall of said seat defining said seat aperture under the free end portion of said reed is displaced outwardly from the corresponding portion of the inner peripheral wall of said base defining said base aperture.

The above and other objects, features and advantages of the present invention will become more apparent from the following description of a preferred embodiment thereof taken in conjunction with the accompanying drawings.

DESCRIPTION OF THE PREFERRED EMBODIMENT

Figure 1:
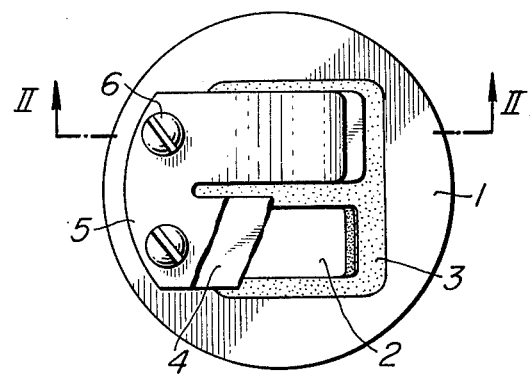
FIG. 1 is a top view of a reed valve according to the present invention, in which a reed and a stopper are partly broken away.
Figure 2:
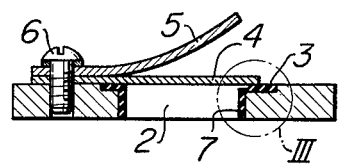
FIG. 2 is a sectional view taken along the line II—II of FIG. 1.
Figure 3:
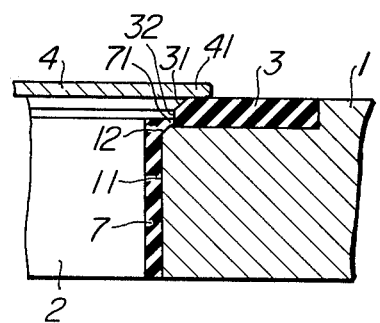
FIG. 3 is a fragmentary sectional view, on enlarged scale, illustrating a portion encircled by a circle III in FIG. 2.

Referring to FIGS. 1, 2 and 3, a reed valve in accordance with the present invention has a metal base 1 formed with apertures 2 which define the passages for a fluid. An apertured shock absorbing seat 3 made of a rubber or the like is embedded in the base 1 in coplanar relationship with the upper surface thereof and so as to surround the apertures 2. One end of a reed 4 made of a steel sheet is securely joined together with a stopper 5 to the base 1 with screws 6 in such a way that the reed 4 may be moved away from the seat 3 so as to open the apertures 2 when the pressure on the side of the stopper 5 drops negative. The inner peripheral wall 11 defining the aperture 2 is covered with a thin layer 7 which is formed integral with the seat 3.

Referring particularly to FIG. 3, the inner peripheral wall 32 of the seat 3 is displaced outwardly from the inner wall 11 of the base 1 by a suitable distance at a portion thereof under the free end portion 41 of the reed 4, and the upper edge 31 of the inner wall 32 is beveled. The upper edge of the inner wall 11 of the aperture 2 is also beveled as indicated by 12. The bridge portion 71 between the horizontal seat 3 and the vertical layer 7 is lesser in thickness than the seat 3. The undersurface of the bridge portion is so shaped as to follow the beveled edge 12.

Next referring again to FIGS. 1, 2 and 3, the mode of operation of the reed valve with the above construction will be described when the reed valve is incorporated into a secondary air supply system for an internal combustion engine. The upper side of the reed valve is communicated with an exhaust pipe (not shown) of the engine while the lower side is communicated with an air cleaner (not shown).

When the pressure of exhaust gases drops negative, the reed 4 is forced to move away from the seat 3 so that the atmospheric air flows through the apertures 2 into the exhaust pipe. On the other hand, when the pressure of exhaust gases rise positive, the reed 4 is forced to seat against the seat 3 under the returning force of the reed 4 and under the pressure of exhaust gases, whereby the apertures 2 are closed. In this latter case, the reed 4 is forced to violently strike against the seat 3.

When the exhaust gases flow backward through the reed valve to the air cleaner, the impacts exerted between both the reed 4 and seat 3 are remarkably increased. However, according to the present invention the seat 3 which receives the impact force from the reed 4 is supported flat on the base 1 and is free from adverse effects from the beveled edge 12 so that the deformation stresses produced in the seat 3 may be remarkably reduced as compared with the conventional reed valves. Therefore under the severe operating conditions, the mechanical failures such as cracking and fracturing may be avoided and consequently a long lifetime may be ensured.

The reed valves in accordance with the present invention i.e. reed valves substantially identical to the reed valves shown in FIGS. 1-3 as well as the conventional reed valves were tested under severe operating conditions of an engine. The reed valves of the present invention tested were substantially as shown in FIG. 3 and had the following features:

(1) displacing outwardly the inner peripheral wall of the seat under the free end portion of the reed;

(2) beveling the upper edge of the displaced inner peripheral wall of the seat;

(3) beveling the upper edge of the corresponding inner wall of the base;

(4) covering the inner wall of the base with a thin layer formed integral with the seat;

(5) forming a bridge portion between the seat and the vertical layer of lesser thickness than seat; and (6) shaping the undersurface of the bridge portion so as to make close contact with the beveled upper edge of the base. With the conventional reed valves, cracking was started at the portion of the seat 3 which engages with the free end portion 41 of the reed 4 only one hour after the test had been started, and the cracked portion was broken after only a few hours. On the other hand, no failure, cracking or breakage occured to the reed valves in accordance with the present invention even after 100 hours.

So far the inner wall of the aperture 2 have been described as being lined with the thin layers 7, but they may be eliminated. Instead of being beveled, the upper edge 31 may be rounded. So far the inner peripheral wall of the seat 3 has been described as being displaced outwardly from the inner wall 11 of the aperture only a portion at which the free end portion 41 of the reed strikes against the seat 3, but it will be understood that this arrangement may be made on the remaining portion of the seat 3.

The apertures 2 of the reed valve seat 3 and the reed 4 are shown elongated rectangular, but it will be understood that they may be circular as far as the inner peripheral wall 32 of the seat 3 is displaced outwardly from the inner wall 11 of the aperture and the upper edge 31 of the inner wall 32 is beveled or rounded. Effects and features substantially similar to those of the preferred embodiment may be attained.

In summary, according to the present invention the cracking and fracturing of the seat 3 due to the heavy impact from the reed 4 may be positively avoided, whereby the highly reliable and dependable operation of the reed valve may be ensured.

What is claimed is:

1. In a reed valve comprising a base formed with at least one aperture through which a fluid flows, a shock absorbing seat attached to the upper surface of said base and having at least one aperture in registered relation with said aperture of said base and a reed made of a resilient sheet material and securely fixed at its one end to said base so as to extend over said aperture of said seat for opening and closing said aperture in response to the pressure variations applied to the upper surface thereof, an improvement in which at least a portion of the inner peripheral wall of said seat defining said seat aperture under the free end portion of said reed is displaced outwardly from the corresponding portion of the inner peripheral wall of said base defining said base aperture; the upper edge of said inner peripheral wall of said seat being beveled; said base being formed on the upper surface thereof with a recess surrounding said base aperture and having a depth equivalent to the thickness of said seat for tightly fitting said seat thereinto; said inner peripheral wall of said base aperture and a portion of the bottom wall of said recess uncovered with said seat being covered with a thin layer formed integral with said seat and the upper edge of said inner peripheral wall of said base aperture and the inner corner of said thin layer covering said upper edge of said base aperture being beveled.

2. In a reed valve comprising a base formed with at least one aperture through which a fluid flows, a shock absorbing seat attached to the upper surface of said base and having at least one aperture in registered relation with said aperture of said base and a reed made of a resilient sheet material and securely fixed at its one end to said base so as to extend over said aperture of said seat for opening and closing said aperture in response to the pressure variations applied to the upper surface thereof, an improvement in which at least a portion of the inner peripheral wall of said seat defining said seat aperture under the free end portion of said reed is displaced outwardly from the corresponding portion of the inner peripheral wall of said base defining said base aperture; the upper edge of said inner peripheral wall of said seat being beveled; said base being formed on the upper surface thereof with a recess surrounding said base aperture and having a depth equivalent to the thickness of said seat for tightly fitting said seat thereinto; said inner peripheral wall of said base aperture and a portion of the bottom wall of said recess uncovered with said seat being covered with a thin layer formed integral with said seat and the upper edge of said inner peripheral wall of said base aperture and the inner corner said thin layer covering said upper edge of said base aperture being rounded.

3. In a reed valve comprising a base formed with at least one aperture through which a fluid flows, a shock absorbing seat made of elastomeric material and attached to the upper surface of said base and having at least one aperture in registered relation with said aperture of said base, and a reed made of a resilient sheet material and securely fixed at its one end to said base so as to extend over said aperture of said seat for opening and closing said aperture in response to the pressure variations applied to the upper surface thereof, an improvement in which at least a portion of the inner peripheral wall of said seat defining said seat aperture under the free end portion of said reed is displaced outwardly from the corresponding portion of the inner peripheral wall of said base defining said base aperture, and in which a portion of the upper surface of said base defined between said displaced portion of said inner peripheral wall of said seat and said corresponding portion of said inner peripheral wall of said base defining said base aperture, and at least said portion of the inner peripheral wall of said base, are both covered with a thin layer made of elastomeric material integral with said seat; said base being formed on the upper surface thereof with a recess surrounding said base aperture and having a depth equivalent to the thickness of said seat for tightly fitting said seat thereinto; the upper edge of said inner peripheral wall of said seat being beveled; the upper edge of said base aperture and inner corner of said thin layer covering the upper edge of said base aperture being beveled.

4. In a reed valve comprising a base formed with at least one aperture through which a fluid flows, a shock absorbing seat made of elastomeric material and attached to the upper surface of said base and having at least one aperture in registered relation with said aperture of said base, and a reed made of a resilient sheet material and securely fixed at its one end to said base so as to extend over said aperture of said seat for opening and closing said aperture in response to the pressure variations applied to the upper surface thereof, an improvement in which at least a portion of the inner peripheral wall of said seat defining said seat aperture under the free end portion of said reed is displaced outwardly from the corresponding portion of the inner peripheral wall of said base defining said base aperture and in which a portion of the upper surface of said base defined between said displaced portion of said inner peripheral wall of said seat and said corresponding portion of said inner peripheral wall of said base defining said base aperture, and at least said portion of the inner peripheral wall of said base, are both covered with a thin layer made of elastomeric material integral with said seat; said base being formed on the upper surface thereof with a recess surrounding said base aperture and having a depth equivalent to the thickness of said seat for tightly fitting said seat thereinto; the upper edge of said inner peripheral wall of said seat being rounded; the upper edge of said base aperture and inner corner of said thin layer covering the upper edge of said base aperture being beveled.

5. In a reed valve comprising a base formed with at least one aperture through which a fluid flows, a shock absorbing seat made of elastomeric material and attached to the upper surface of said base and having at least one aperture in registered relation with said aperture of said base, and a reed made of a resilient sheet material and securely fixed at its one end to said base so as to extend over said aperture of said seat for opening and closing said aperture in response to the pressure variations applied to the upper surface thereof, an improvement in which at least a portion of the inner peripheral wall of said seat defining said seat aperture under the free end portion of said reed is displaced outwardly from the corresponding portion of the inner peripheral wall of said base defining said base aperture and in which a portion of the upper surface of said base defined between said displace portion of said inner peripheral wall of said seat and said corresponding portion of said inner peripheral wall of said base defining said base aperture, and at least said portion of the inner peripheral wall of said base, are both covered with a thin layer made of elastomeric material integral with said seat; said base being formed on the upper surface thereof with a recess surrounding said base aperture and having a depth equivalent to the thickness of said seat for tightly fitting said seat thereinto; the upper edge of said inner peripheral wall of said seat being beveled, the upper edge of said base aperture and the edge of said thin layer covering the inner corner of said base aperture being rounded.

6. In a reed valve comprising a base formed with at least one aperture through which a fluid flows, a shock absorbing seat made of elastomeric material and attached to the upper surface of said base and having at least one aperture in registered relation with said aperture of said base, and a reed made of a resilient sheet material and securely fixed at its one end to said base so as to extend over said aperture of said seat for opening and closing said aperture in response to the pressure variations applied to the upper surface thereof, an improvement in which at least a portion of the inner peripheral wall of said seat defining said seat aperture under the free end portion of said reed is displaced outwardly from the corresponding portion of the inner peripheral wall of said base defining said base aperture and in which a portion of the upper surface of said base defined between said displaced portion of said inner peripheral wall of said seat and said corresponding portion of said inner peripheral wall of said base defining said base aperture, and at least said portion of the inner peripheral wall of said base, are both covered with a thin layer made of elastomeric material integral with said seat; said base being formed on the upper surface thereof with a recess surrounding said base aperture and having a depth equivalent to the thickness of said seat for tightly fitting said seat thereinto; the upper edge of said inner peripheral wall of said seat being rounded, the upper edge of said base aperture and the edge of said thin layer covering the inner corner of said base aperture being rounded.

7. A reed valve as set forth in any of claims 1, 2, 3, 4, 5 or 6 and adapted for use in a system for introducing the secondary air through said aperture into an exhaust system of an internal combustion engine, in which said reed is arranged to respond to the pressure variations in said exhaust system.

* * * * *